(12) United States Patent
Newman et al.

(10) Patent No.: US 8,533,788 B2
(45) Date of Patent: Sep. 10, 2013

(54) WIRELESS DEVICE NETWORK ASSOCIATION

(75) Inventors: David M. Newman, Sachse, TX (US);
Harshal S. Chhaya, Plano, TX (US);
Jamie Lane Graves, Corinth, TX (US);
Robert Allen Lorentzen, Carrollton, TX (US); Todd Michael Wostrel, Cross Roads, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/279,082

(22) Filed: Oct. 21, 2011

(65) Prior Publication Data

US 2012/0102550 A1    Apr. 26, 2012

Related U.S. Application Data

(60) Provisional application No. 61/405,897, filed on Oct. 22, 2010.

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC .......................................................... 726/4

(58) Field of Classification Search
USPC ............................................................. 726/4
See application file for complete search history.

(56) References Cited

U.S. PATENT DOCUMENTS

| | | | |
|---|---|---|---|
| 8,127,039 B2* | 2/2012 | Patton et al. | 709/232 |
| 2009/0043909 A1* | 2/2009 | Patton et al. | 709/232 |
| 2009/0115606 A1* | 5/2009 | Rosenquist | 340/540 |
| 2009/0144838 A1* | 6/2009 | Rosenquist | 726/34 |

* cited by examiner

*Primary Examiner* — Kambiz Zand
*Assistant Examiner* — Stephen Sanders
(74) *Attorney, Agent, or Firm* — Mirna Abyad; W. James Brady; Frederick J. Telecky, Jr.

(57) ABSTRACT

A method for associating handheld calculators with a network host system of a classroom network that includes receiving a service set identifier (SSID) of the classroom network by a handheld calculator, wherein the SSID includes a network mode indicator, and operating the handheld calculator according to the network mode indicator. The method may also include operating the handheld calculator in a configuration mode in which the handheld calculator sends a request for association to the network host system, wherein the request includes a unique identifier of the first handheld calculator, and acceptance of the request by the network host system, wherein authentication information for the handheld calculator is stored by the network host system to indicate that the first handheld calculator is associated with the classroom network.

11 Claims, 6 Drawing Sheets

WIRELESS DEVICE NETWORK ASSOCIATION

CROSS-REFERENCE TO RELATED APPLICATIONS

This application claims benefit of U.S. Provisional Patent Application Ser. No. 61/405,897, filed Oct. 22, 2010, which is incorporated herein by reference in its entirety.

BACKGROUND OF THE INVENTION

1. Field of the Invention

Embodiments of the present invention generally relate to association of wireless devices in a network.

2. Description of the Related Art

With ever increasing frequency, school classrooms are equipped with wireless devices, e.g., handheld calculators, that connect to a classroom network. As the number of classroom networks within a building increase, the likelihood of adjacent classrooms using classroom networks increases. Therefore a mechanism is used that segregates multiple overlapping classroom networks into logically separate networks. This mechanism typically takes the form of manually associating each wireless device with a specific classroom network by performing operations on each wireless device to select the correct network.

Further, the time required for a handheld calculator to wirelessly connect to a classroom network is a critical function in the operation of the network. A typical class is approximately sixty minutes long, and will contain approximately thirty students. At the beginning of class, all of the students attempt to connect their handheld calculators to the classroom network. The time until all of the devices are connected is typically on the order of 10 minutes, which reduces the time that the students can use the network by about 15% each day.

SUMMARY

Embodiments of the present invention relate to methods and systems for associating wireless devices in a network. In one aspect, a method for associating handheld calculators with a network host system of a classroom network includes receiving a service set identifier (SSID) of the classroom network by a handheld calculator, wherein the SSID includes a network mode indicator, and operating the handheld calculator according to the network mode indicator. The method may also include operating the handheld calculator in a configuration mode in which the handheld calculator sends a request for association to the network host system, wherein the request includes a unique identifier of the handheld calculator, and acceptance of the request by the network host system, wherein authentication information for the handheld calculator is stored by the network host system to indicate that the first handheld calculator is associated with the classroom network.

In another aspect, a system includes a network host system configured to selectively operate a classroom network in a configuration mode and a normal mode and to broadcast a service set identifier (SSID) comprising an operation mode indicator, and a plurality of handheld calculators each configured to receive the SSID from the network host system and to operate according to the operation mode indicator.

BRIEF DESCRIPTION OF THE DRAWINGS

Particular embodiments in accordance with the invention will now be described, by way of example, and with reference to the accompanying drawings.

DETAILED DESCRIPTION OF EMBODIMENTS OF THE INVENTION

Figure 1A:
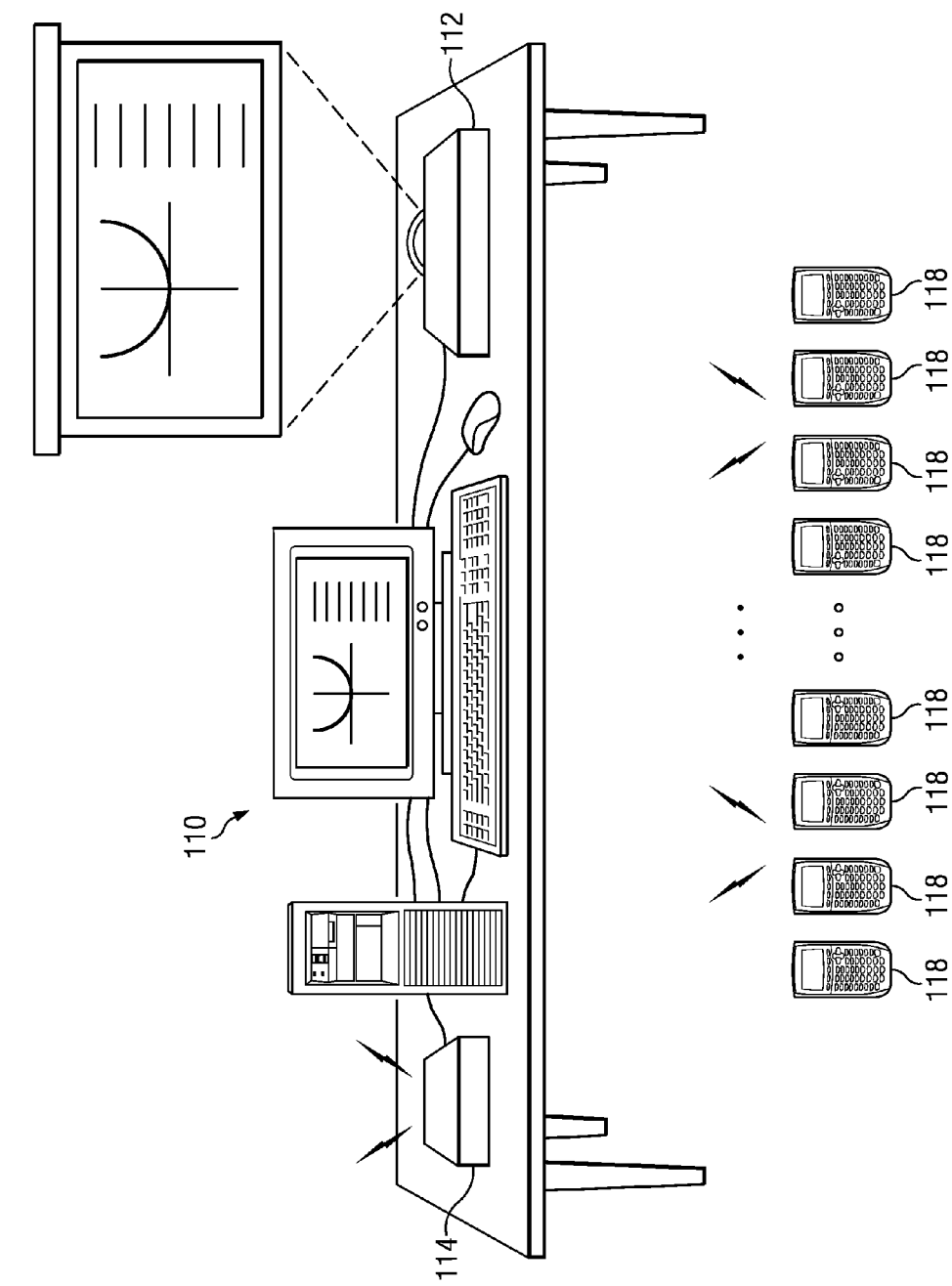
FIGS. 1A and 1B show examples of classroom networks.

Specific embodiments of the invention will now be described in detail with reference to the accompanying figures. Like elements in the various figures are denoted by like reference numerals for consistency.

Embodiments of the invention provide for automatic association of portable wireless devices with the correct classroom network. More specifically, the network operation mode is encoded in the service set identifier (SSID) of the network sent to the portable wireless devices, e.g., handheld calculators. The mode encoded in the SSID is used by a receiving portable wireless device to determine the operational mode of the portable wireless device. An SSID is the unique name (identifier) of a wireless local area network that differentiates one network from other networks.

For example, a classroom network of handheld calculators may operate in one of two modes: a network configuration mode and a normal mode. In the network configuration mode, the handheld calculator connects to the network to receive exchange information and security keys need to form a working classroom network. In the normal mode, the handheld calculator connects to the network to perform data exchanges such as documents, questions, etc. under the control of the network host computer, e.g., the computer used by the teacher. In prior art classroom networks, a handheld calculator had no way to know the current network operating mode and was required to perform connection attempts in both modes sequentially. Connection failures were frequent due to a large number of devices attempting to connect at the same time, e.g., at the beginning of a class, resulting in numerous repetitions of the connection process. In addition, because connection in both modes was attempted, half of the connection attempts were wasted.

In some embodiments, the classroom network SSID is modified to convey the mode of the network to the handheld calculators. That is, an SSID containing a designated character, e.g., "S", in a predetermined position conveys a setup, i.e., network configuration, mode and an SSID with a different trigger character, e.g., "N", in the predetermined position conveys normal classroom operation. Additional characters may be used for additional modes. Thus, the handheld calculator can attempt to connect in the mode that is appropriate to the network configuration specified in the SSID, which eliminates many wasted connection attempts. With the wasted connection attempts eliminated, connection times, even with the high level of network congestion found in a classroom, are much faster.

To further reduce the connection times, only devices associated with the classroom network may be allowed to connect to the classroom network in normal mode. That is, in some embodiments, the classroom network may be configured to accept connections from the handheld calculators associated with that network and to reject connections from any other handheld calculators. To perform this configuration, the classroom network may be placed in network configuration mode, which will cause an SSID with a network configuration mode identifier to be broadcast.

While in this mode, any and all wireless devices may be allowed to enter the network. However, network activity of the wireless devices is restricted to prevent rogue devices from disrupting the classroom network. As the unknown wireless devices request association with the network, the network host computer presents the devices requesting entry into the network to the network administrator. The network administrator can then accept or reject each device as is appropriate. Identifying information for each accepted device, e.g., the media access control (MAC) address of the device, is then stored for use during normal operation to restrict access to the network to those accepted devices.

When the network administrator is ready to begin a normal classroom network session, the network configuration is returned to normal mode. In the normal operation configuration, only previously accepted wireless devices are allowed to join the classroom network. In this normal mode, wireless devices on the network are permitted to perform normal network activities that are normally performed on the classroom network.

In some embodiments, the association process may be performed one time (prior to the first normal classroom network use) and the results of the association process saved. Each day when normal classroom network activities are started, when the wireless devices are turned on, they will request entry into all networks found. The network host will check the identification information of accepted wireless devices and grant entry only to known and accepted devices.

Note that it is possible to transport an entire classroom network from one classroom to another classroom without loss of network association since the device associations are maintained on the network host. In some school systems, the classroom network is shared between multiple teachers in different classrooms. Further, the saved associations between wireless devices and the classroom networks can be maintained centrally for several co-located networks. This allows a central administrator to edit/maintain/change associations easily.

FIG. 1A shows a diagram of a classroom network configured to perform network association methods as described herein. As shown in FIG. 1A, the classroom network includes a computer system 110 communicatively coupled to a projector 112 (e.g., a digital projector), which may project images and video provided by the computer system 110 onto a wall, screen, or other surface. The computer system 110 includes presentation software (not shown) for managing the presentation of screen content received from a handheld calculator as the handheld calculator is operated. The presentation may be made using a display device in the computer system 110, or using a combination of the display device and the projector 112. The computer system 110 may be any general purpose computing device, such as a desktop computer, a mini-computer, a main frame, a laptop computer, a netbook, a tablet computer, or the like.

The computer system 110 is also communicatively coupled to an access point 114 via a Universal Serial Bus (USB) connection. The access point 114 provides a wireless interface such as 802.11b, 802.11g, or the like for the computer system 110 to communicate with one or more handheld calculators 118. Once connected, bi-directional communications may be performed between the handheld calculators 118 and the computer system 110 via the access point 114. The computer system 110 and the access point 114 are illustrated as separate components for illustrative purposes only. In some embodiments, the access point 114 may be integrated into the computer system 110. Further, the coupling between the access point 114 and the computer system 110 may be any suitable wired or wireless connection. The combination of the computer system 110 and the access point 114 are the network host for the classroom network.

The handheld calculators 118 may be any suitable handheld calculators, such as, for example, graphing calculators in the TI-Nspire product line available from Texas Instruments, Inc. To allow wireless communication with the access point 114 and/or the computer system 110, a wireless transceiver may be integrated into a handheld calculator 118 or a wireless adaptor or a wireless cradle may be externally attached via a port on a handheld calculator 118.

Figure 1B:
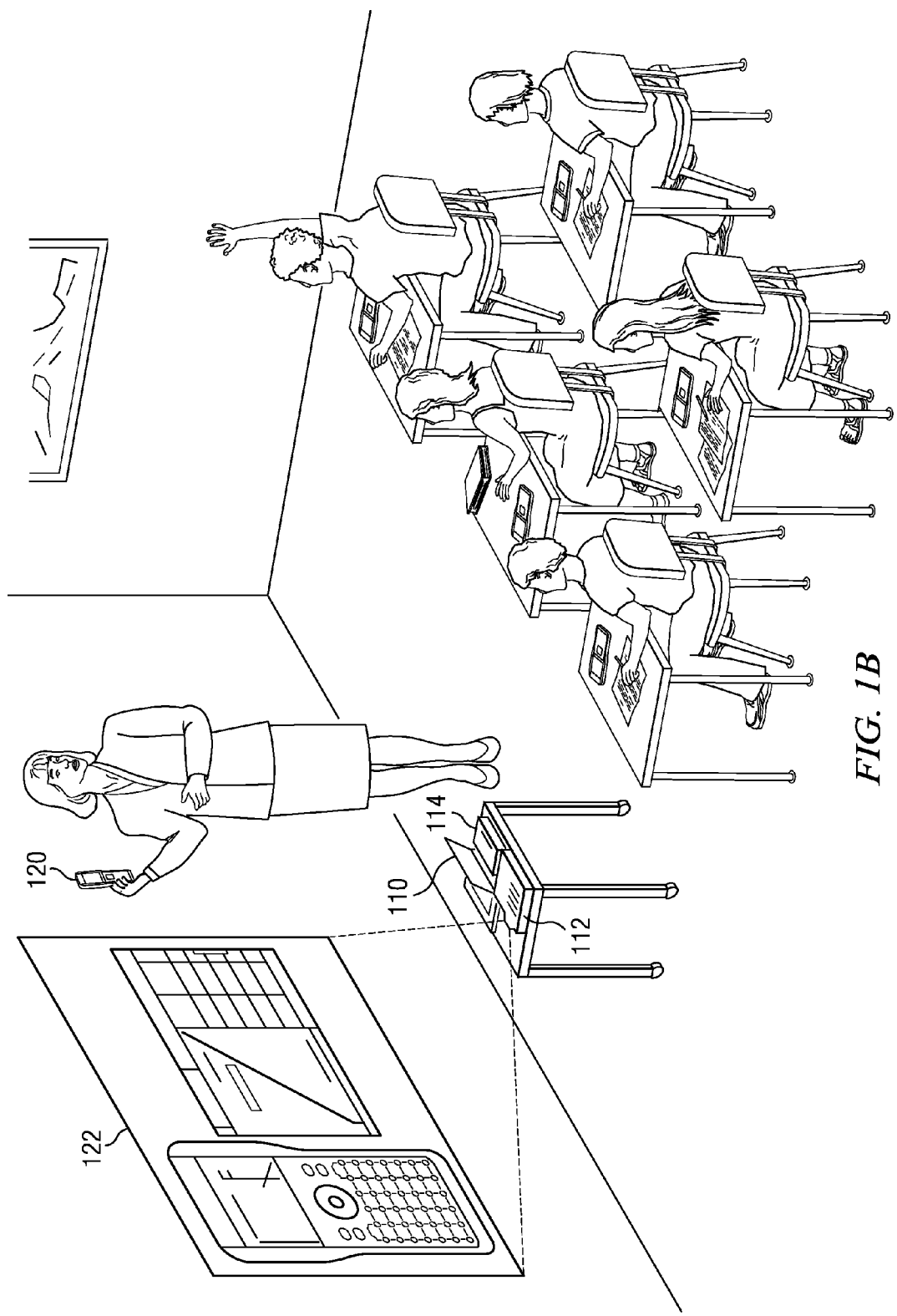

FIG. 1B shows an example of a classroom network in a classroom setting. In this embodiment, the computer system 110 is a laptop computer, and the access point 114 is connected by a USB connection to the computer system 110. The instructor's handheld calculator 120 and the handheld calculators in use by the students are all connected by a wireless communication link to the access point 114. Presentation software executing on the computer system 110 is showing the content, i.e., screen image, of the display on the instructor's handheld calculator 120 on the display device of the computer system 110 and on the screen 122 via the projector 112 along with a "skin" duplicating the appearance of the instructor's handheld calculator 120. The projector 112 is used to project the information shown on the display device onto the screen 122.

Figure 2:
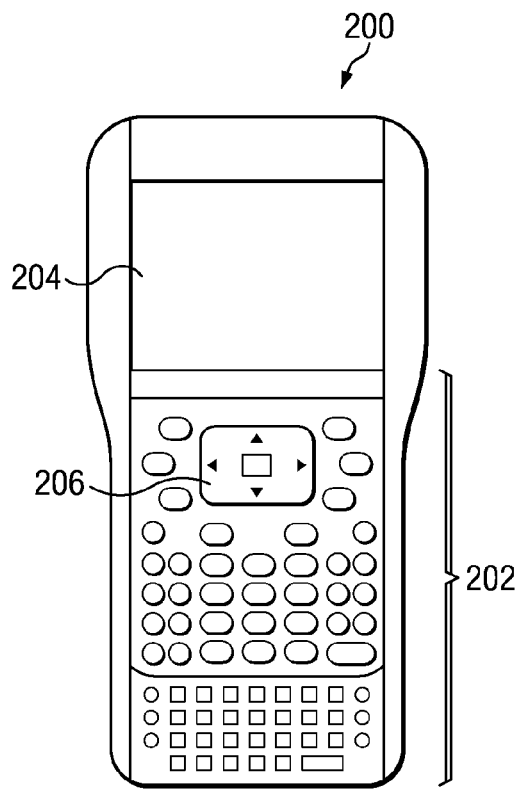
FIG. 2 shows an example of a handheld calculator.

FIG. 2 shows an example of a handheld calculator 200 (e.g., 118, 120 of FIGS. 1A and 1B) in accordance with one or more embodiments of the invention. For illustrative purposes, the handheld calculator illustrated in FIG. 2 is similar to graphing calculators available from Texas Instruments Inc. Handheld calculators with more or fewer components may be used in embodiments of the invention. As shown in FIG. 2, the handheld calculator 200 includes a graphical display 204, and a keypad 202 that includes a touchpad 206. The graphical display 204 may be used to display, among other things, information input to applications executing on the handheld calculator 200 and various outputs of the applications. The graphical display 204 may be, for example, an LCD display. The keypad 202 allows a user, e.g., a student or instructor, to enter data and functions and to start and interact with applications executing on the handheld calculator 200. The keypad 202 also includes an alphabetic keyboard for entering text. The touchpad 206 allows a user to interact with the display 204 by translating the motion and position of the user's fingers on the touchpad 206 to provide functionality similar to using an external pointing device, e.g., a mouse. A user may use the touchpad 206 to perform operations similar to using a pointing device on a computer system, e.g., scrolling the display 204 content, pointer positioning, selecting, highlighting, etc.

Figure 3A:
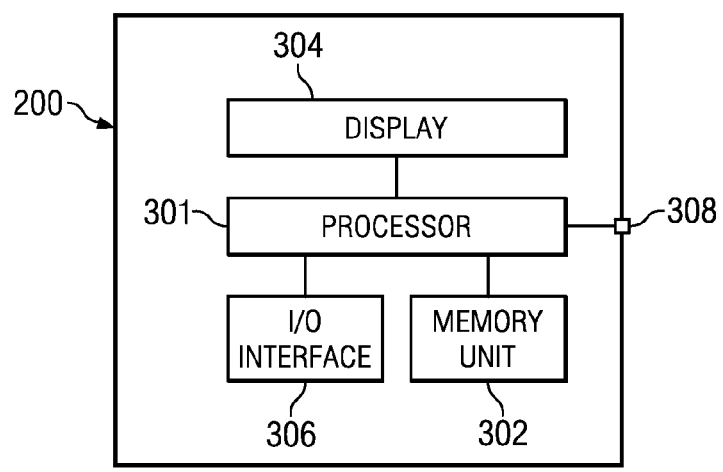
FIG. 3A is a block diagram of a handheld calculator.
Figure 3B:
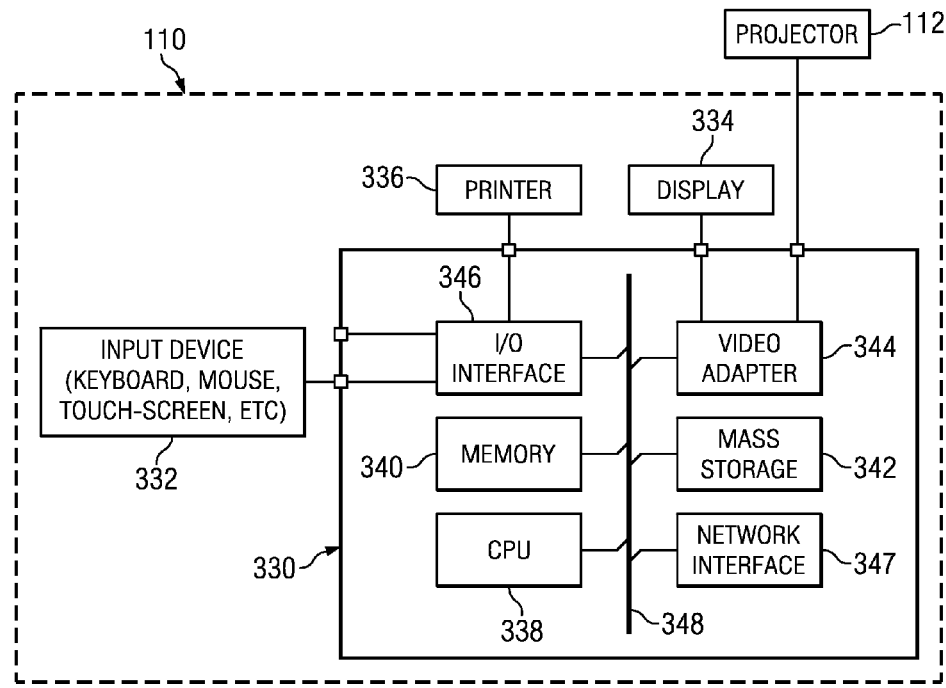
FIG. 3B is a block diagram of a computer system.

FIGS. 3A and 3B are block diagrams of the handheld calculator 200 and the computer system 110, respectively, in accordance with one or more embodiments of the invention. The handheld calculator 200 includes a processor 301 coupled to a memory unit 302, which may include one or both of read-only memory (ROM) and random-access memory (RAM). In some embodiments, the ROM stores software programs and the RAM stores intermediate data and operating results. An input/output port 308 provides connectivity to external devices, e.g., a wireless adaptor or wireless cradle. In one or more embodiments, the input/output port 308 is a bi-directional connection such as a mini-A USB port. Also included in the handheld calculator 200 are a display 304 and an I/O interface 306. The I/O interface 306 provides an interface to couple input devices such as the touchpad 206 and the keypad 202 to the processor 301. In some embodiments, the handheld calculator 200 may also include an integrated wireless interface (not shown) or a port for connecting an external wireless interface (not shown). In one or more embodiments, the memory unit 302 stores software instructions to be executed by the processor 301 to implement some or all of the calculator based operations of network association methods described herein.

The computer system 110 includes a processing unit 330 equipped with one or more input devices 332 (e.g., a mouse, a keyboard, or the like), and one or more output devices, such as a display 334, a printer 336, or the like. In some embodiments of the invention, the display 334 may be touch screen, thus allowing the display 334 to also function as an input device. The processing unit 330 may be, for example, a desktop computer, a workstation, a laptop computer, a dedicated unit customized for a particular application, or the like. The display may be any suitable visual display unit such as, for example, a computer monitor, an LED, LCD, or plasma display, a television, a high definition television, an interactive white board, or a combination thereof.

The processing unit 330 includes a central processing unit (CPU) 338, memory 340, a mass storage device 342, a video adapter 344, and an I/O interface 346 connected to a bus 348. The bus 348 may be one or more of any type of several bus architectures including a memory bus or memory controller, a peripheral bus, video bus, or the like. The CPU 338 may be any type of electronic data processor. For example, the CPU 338 may be a processor from Intel Corp., a processor from Advanced Micro Devices, Inc., a Reduced Instruction Set Computer (RISC), an Application-Specific Integrated Circuit (ASIC), or the like. The memory 340 may be any type of system memory such as static random access memory (SRAM), dynamic random access memory (DRAM), synchronous DRAM (SDRAM), read-only memory (ROM), a combination thereof, or the like. Further, the memory 340 may include ROM for use at boot-up, and DRAM for data storage for use while executing programs.

The mass storage device 342 (e.g., a computer readable medium) may include any type of storage device configured to store data, programs, and other information and to make the data, programs, and other information accessible via the bus 348. In one or more embodiments, the mass storage device 342 stores software instructions to be executed by the CPU 338 to implement some or all of the network host operations of network association methods described herein. The mass storage device 342 may be, for example, one or more of a hard disk drive, a magnetic disk drive, an optical disk drive, or the like. The software instructions may be initially stored in a computer-readable medium such as a compact disc (CD), a diskette, a tape, a file, memory, or any other computer readable storage device and loaded and executed by the CPU 338. In some cases, the software may also be sold in a computer program product, which includes the computer-readable medium and packaging materials for the computer-readable medium. In some cases, the software may be distributed to the computer system 110 via removable computer readable media (e.g., floppy disk, optical disk, flash memory, USB key), via a transmission path from computer readable media on another computer system (e.g., a server), etc.

The video adapter 344 and the I/O interface 346 provide interfaces to couple external input and output devices to the processing unit 330. As illustrated in FIG. 3B, examples of input and output devices include the display 334 and projector 112 coupled to the video adapter 344 and the mouse/keyboard 332 and the printer 336 coupled to the I/O interface 346.

The processing unit 330 also includes a network interface 347. The network interface 347 allows the processing unit 330 to communicate with remote units via a network (not shown). In one or more embodiments, the network interface 347 allows the computer system 110 to communicate via a network to the handheld calculators 118, 120. The network interface 347 may provide an interface for a wired link, such as an Ethernet cable or the like, or a wireless link.

The computer system 110 may also include other components not specifically shown. For example, the computer system 110 may include power supplies, cables, a motherboard, removable storage media, cases, and the like.

Figure 4:
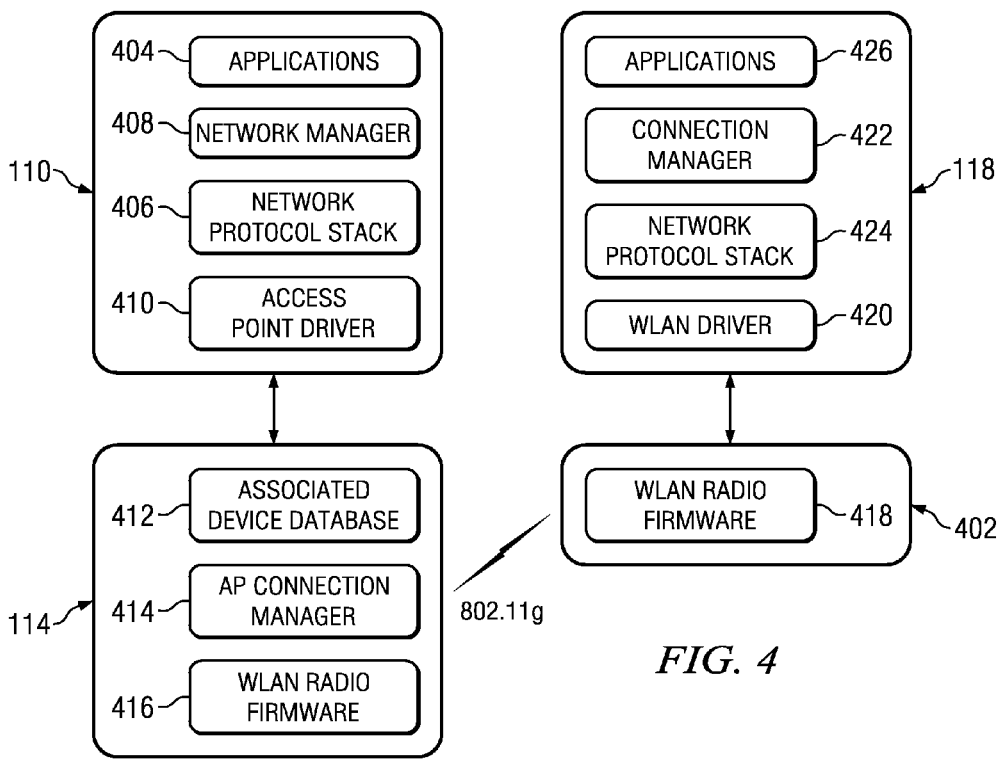
FIG. 4 is a block diagram of a classroom network communication architecture.

FIG. 4 is a block diagram of the classroom network communication architecture of FIGS. 1A and 1B. The communication architecture includes the network host system, i.e., the computer 110 and the access point 114, and a representative calculator 118 coupled to the network via a wireless adaptor 402. The computer 110 includes an access point driver 410, a network protocol stack 406, a network manager 408, and various applications 404. Other functionality may also be present. The access point driver 410 provides functionality for bidirectional communication with the access point 114. Such communication may include sending control commands from the network manager 408 to the access point 114 to designate the network mode, i.e., configuration mode or normal mode. Such communication may also include control commands and other information from the applications 404 to be sent to the calculator 118 and the receipt of responses to the commands and other information from the calculator 118.

The network protocol stack 406 implements the network protocol suite of the classroom network on the computer 110. The network protocol stack 406 provides network communication services for the applications 404 and the network manager 408. The network protocol stack 406 may provide standard networking protocols such as transmission control protocol (TCP), user datagram protocol (UDP), internet protocol (IP) or custom protocols or a combination thereof.

The applications 404 provide classroom management functionality as well as capabilities to create documents, transfer them to connected calculators, collect documents from the calculators, and to automatically grade student work. The applications 404 may also include features that allow the teacher to create and manage a classroom roster and a student portfolio. The applications may also allow the teacher to view all of the connected calculators and monitor student progress. The functionality described above may be in one application or spread across multiple applications.

The network manager 408 provides functionality for a network administrator to manage the network. For example, the network manager 408 includes a user interface that allows the network administrator to designate the operation mode of the network. The network manager 408 also includes a user interface for presenting identification information of handheld calculators requesting association with the network and for allowing the network administrator to designate which calculators to accept and which to reject. The network manager 408 may also include a user interface that allows the network administrator to edit the associated device database 412 to add and remove associated calculators.

The access point 114 includes an access point (AP) connection manager 414, an associated device database 412, and wireless local area network (WLAN) radio firmware 416. Other functionality may also be included. The WLAN radio firmware 416 provides wireless routing functionality between the access point 114 and the calculator 118. The AP connection manager 414 includes functionality to manage the connection activity between the network host and the calculators, e.g., calculator 118, according to the network operation mode. More specifically, if the network operation mode is configuration mode, the AP connection manager 414 causes the configuration mode SSID for the classroom network to be broadcast. The AP connection manager 414 then receives requests to be associated with the network from calculators responsive to the SSID and provides the identifiers of the calculators to the network manager 408 for display to the network administrator for acceptance/rejection. The AP connection manager 414 receives the choices of the network administrator from the network manager 408, and performs actions according to the choices. If a calculator is accepted, then the AP connection manager 414 adds authentication information for the calculator to the associated device database 412. The AP connection manager 414 also includes functionality to cause any connected calculators to disconnect when the network operation mode is returned to normal mode.

If the network operation mode is normal mode, the AP connection manager 414 causes the normal mode SSID for the classroom network to be broadcast. The AP connection manager 414 then controls which calculators are allowed to join the network based on the authentication information in the associated device database 412. That is the AP connection manager 414 receives requests to join the network from calculators responsive to the SSID, validates the authentication information provided by the calculators against authentication information in the associated device database 412, and allows those calculators with validated authentication information to join the network. Any calculators with authentication information that does not appear in the associated device database 412 are not allowed to join.

The associated device database 412 may be any suitable storage device and associated software.

The wireless adaptor 402 includes WLAN radio firmware 418. The wireless adaptor 402 may also include other functionality. The WLAN radio firmware 418 provides routing functionality between the calculator 118 and the access point 114.

The representative calculator 118 includes a WLAN driver 420, a network protocol stack 424, a connection manager 422, and various applications 426. The applications 426 provide the primary functionality of the calculator. The application functionality includes but is not limited to basic calculations, function graphing, geometry, and statistical analysis. The WLAN driver 420 provides a software interface to the wireless modem 402 and wireless firmware 418. The driver allows the other software modules to configure the wireless radio firmware 418. Examples of configurable parameters include the security protocol and radio channel.

The network protocol stack 424 implements the network protocol suite of the classroom network on the calculator 118. The network protocol stack 424 provides network communication services for the applications 426 and the connection manager 422. The network protocol stack 424 may provide standard networking protocols like TCP, UDP, and IP, or custom protocols or a combination thereof.

The connection manager 422 includes functionality to manage connection activity between the calculator 118 and the network host system. That is, the connection manager 422 receives network SSIDs from the wireless adaptor 402 and operates the connection activity of the calculator according to network operation modes indicated in the SSIDs. In some embodiments, the connection manager 422 includes functionality to manage the connection activity as per an embodiment of the method of FIG. 6. In some embodiments, the connection manager 422 includes functionality to manage the connection activity as per an embodiment of the method of FIG. 7.

Figure 5:
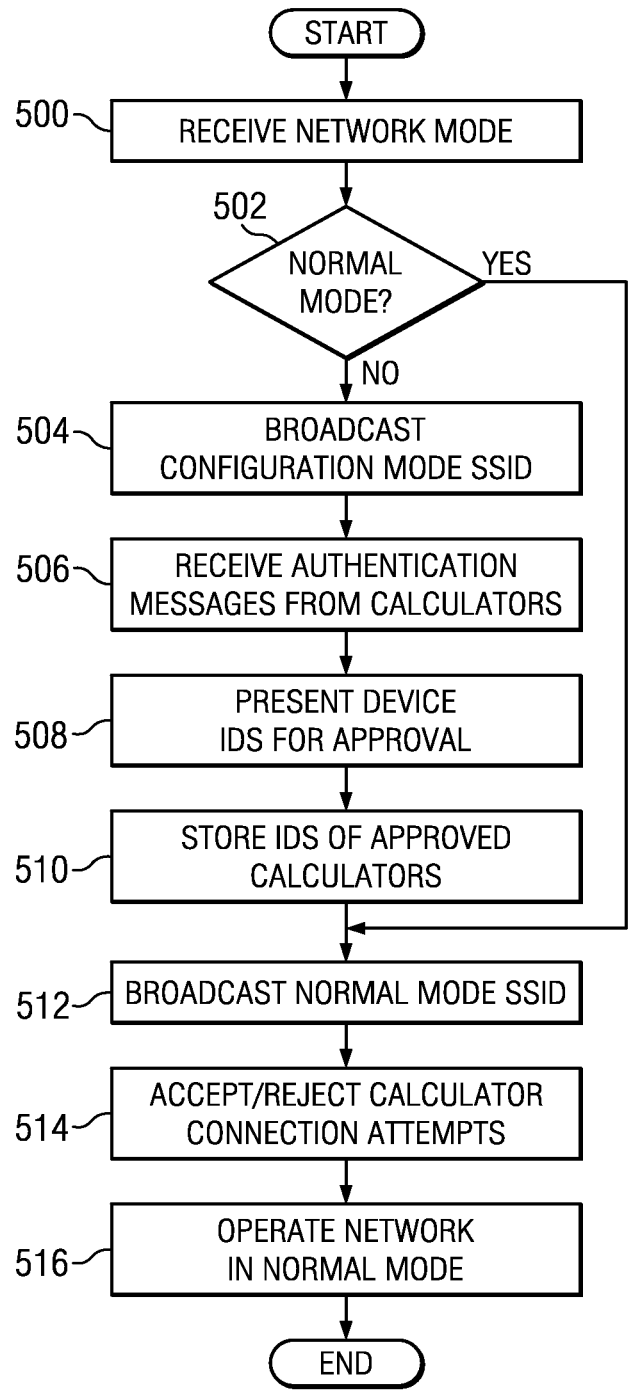
FIGS. 5-7 are flow diagrams of methods.

FIG. 5 is a flow diagram of a method for classroom network device association from the perspective of the network host, e.g., the computer and the access point. Initially, a network operation mode is selected by the network administrator, e.g., the teacher, and the selection is received by the network host computer 500. The network administrator may select configuration mode or normal mode. The configuration mode is selected to permit association of handheld calculators with the classroom network and the normal mode is selected for normal network operation. Only those handheld calculators added to the classroom network in configuration mode will be allowed to connect to the classroom network in normal mode. Connection attempts by other devices will be rejected.

If normal mode is selected 502, then the network SSID is broadcast with a mode identifier added to the SSID at a predetermined position to indicate to any handheld calculator receiving the SSID that the network is operation in normal mode 512. The network SSID is in a predetermined SSID format expected by the handheld calculators. For example, the format of an SSID may include a prefix that identifies the network as a classroom network, e.g., "TI-NAV-N" or TI-NAV-S", followed by some number of characters that identify a specific classroom network. In this example, the last letter in the prefix, i.e., "N" or "S", indicates the mode of the classroom network. Handheld calculators within range that receive the broadcast normal mode SSID attempt to connect to the access point, providing authentication information such as a user name and password. The authentication information is compared to stored authentication information for associated handheld calculators, and connections are accepted only from handheld calculators that have been previously associated with the network 514. After the associated calculators are connected, the network (and each connected calculator) operates in normal mode 516.

If configuration mode is selected 502, then the network SSID is broadcast with an identifier added to the SSID at a specific position to indicate to any handheld calculator receiving the SSID that the network is operating in configuration mode 504. Each handheld calculator within range receives the network configuration SSID, connects to the access point (if allowed), and enters a configuration operation mode in response to detecting the configuration mode identifier in the SSID. In this configuration operation mode, a handheld calculator sends authentication information, e.g., a generic predetermined user name and password, along with a unique identifier for the device, e.g., the media access control (MAC) address of the handheld calculator, to the access point.

The authentication information from the handheld calculators is received by the access point 506 and the unique devices identifiers are presented to the network administrator for approval 508. The device identifiers may be presented in any suitable way. For example, a list of the identifiers may be compiled and displayed. In another example, each identifier may be displayed serially as the authentication information from each calculator is received.

The network administrator views the device identifiers and indicates which of the identified handheld calculators are to be included in the classroom network and which are not to be included. The identifiers of the approved calculators are then stored for use during normal operation 510. The identifiers may be stored in any suitable way, e.g., in a file, a database, etc. In some embodiments, the identifiers are stored in a database on the access point. In some embodiments, a user name and password for a calculator is generated using the device identifier and stored. After the appropriate handheld calculators are associated with the classroom network, the network administrator indicates that the association process is to be ended. The access point completes any remaining processing to complete the association process and disconnects the handheld calculators from the access point to indicate that the configuration is complete. Normal operation mode is then entered 512-516. In some embodiments, the calculators receive a notification of acceptance or rejection. In some embodiments, the acceptance or rejection is implicitly conferred to a calculator based on whether or not the calculator is able to successfully connect in normal mode.

Figure 6:
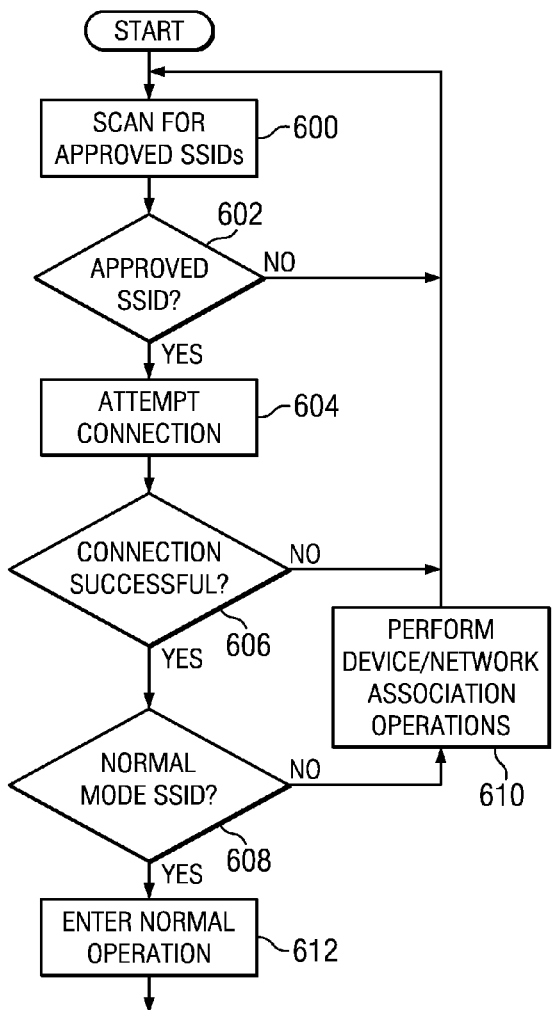

FIG. 6 is a flow diagram of a method for classroom network device association from the perspective of a handheld calculator. Initially, the calculator scans for approved SSIDs, i.e., SSIDs for classroom networks 600. An SSID is approved if the SSID is in a predetermined format as previously explained.

If an approved SSID is found 602, the calculator sends a connection request to the access point of the identified network 604. If the connection attempt is not successful 606, the process continues with the next approved SSID, if any 600, 602. A connection attempt may not be successful, for example, if there is a mismatch in capabilities between the access point and the calculator.

If the connection attempt is successful, the calculator then checks the mode of the SSID 608. If normal mode is indicated, the calculator enters normal operation 612. To enter normal operation, the calculator provides authentication information, e.g., a user name and password, to the access point to complete the connection with the network. In some embodiments, the user name is the MAC address of the calculator and the password is derived from the MAC address, e.g., by encrypting the MAC address. Note that the method of FIG. 6 assumes that the calculator is associated with the particular classroom network to which it successfully connected. As was previously explained, this may not always be the case. For example, the calculator may have successfully connected to the access point of a network in a nearby classroom that is operating in normal mode. In such a case, the calculator will be rejected by that access point when the authentication information is provided. The calculator will then repeat the method of FIG. 6.

If configuration mode is indicated 608, then the calculator enters a configuration mode of operation and performs operations needed to associate the calculator with the classroom network 610. In this configuration operation mode, the calculator sends authentication information, e.g., a generic predetermined user name and password, and a unique identifier for the calculator, e.g., the media access control (MAC) address of the calculator, to the access point. Once the association operations are completed by the network host, the calculator is disconnected from the network. The calculator exits configuration mode, and performs the method again to connect to the classroom network in normal mode. The calculator is not disconnected from the network until the mode of the network is switched to normal mode by the network host. As was previously explained in reference to FIG. 5, the network administrator may accept or reject the association of the calculator with the classroom network as part of the association process. While not specifically shown, if the association of the calculator is rejected, the calculator may perform the method again.

In some embodiments, the calculator stores the SSID of the last successful network connection in normal mode. In such embodiments, the calculator attempts a normal mode connection to that SSID if it is available before attempting connections to any other SSIDs.

Figure 7:
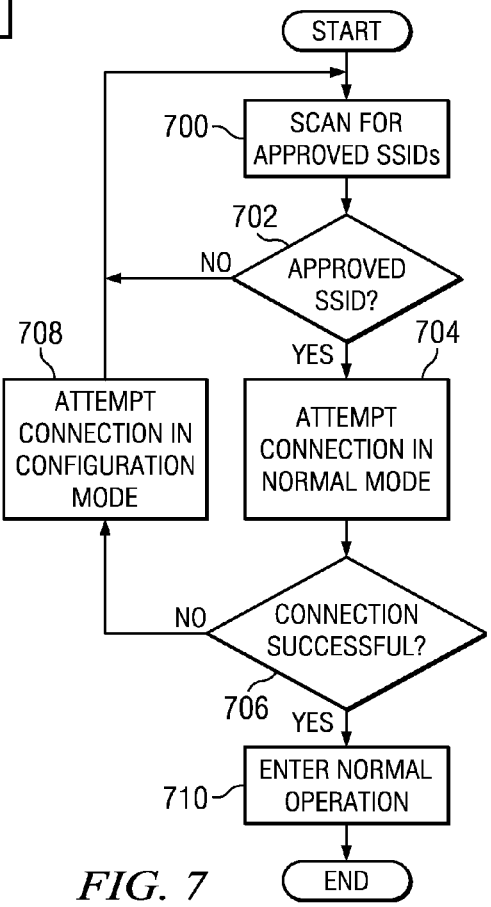

FIG. 7 is a flow diagram of a method for or classroom network device association from the perspective of a handheld calculator. Initially, the calculator scans for approved SSIDs, i.e., SSIDs for classroom networks 700, 702. The scan process may maintain a list of the approved SSIDs detected. If approved SSIDs are detected 702, the calculator first attempts to connect in normal mode 704. More specifically, the calculator attempts to connect to a classroom network using each of the detected SSIDs in turn that indicate that the network is in normal mode until either a connection is successful or all the SSIDs have been tried. For an SSID, the calculator attempts to connect to the access point as previously described. If that connection is successful, the calculator then provides authentication information to the access point to attempt to complete the connection with the network. As previously described, the calculator is accepted into the network if it has been previously associated with the network. If the calculator successfully connects to one of the networks 706, then it enters normal operation mode 710.

If the calculator does not successfully connect using one of the normal mode SSIDs (or there were no normal mode SSIDs detected) 706, the calculator attempts to connect in configuration mode 708. More specifically, the calculator enters configuration mode and attempts to connect to a classroom network using each of the detected SSIDs in turn that indicate that the network is in configuration mode until either a connection is successful or all the SSIDs have been tried. For an SSID, the calculator attempts to connect to the access point as previously described. If that connection is successful, the calculator then provides authentication information to the access point along a unique identifier for the calculator to request association with the network. In some embodiments, to connect in configuration mode, the calculator may use a predetermined user name and password, e.g., "TINAssociate," that is known to an access point and is accepted by an access point when the network is in configuration mode. As was previously discussed, when the calculator attempts to connect in configuration mode, the network administrator is given the opportunity to accept or reject the association of the calculator with the classroom network.

If the connection in configuration mode is not successful (or there were no configuration mode SSIDs detected), the method is repeated. Further, if the connection is successful, the calculator exits configuration mode and performs the method again to connect to the classroom network in normal mode.

In some embodiments, the calculator stores the SSID of the last successful network connection in normal mode. In such embodiments, the calculator attempts a normal mode connection to that SSID if it is available before attempting connections to any other SSIDs.

If the handheld calculators in the classroom network implement the method of FIG. 7, a network host can broadcast both normal mode and configuration mode SSIDs, thus eliminating the need to switch between modes. The initial network configuration can be performed quickly the first day of class rather than requiring pre-configuration of the network. Further, additional calculators can be added to the network at any time without requiring a manual switch to configuration mode.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, embodiments are discussed described in which the wireless devices in the classroom network are handheld calculators. It should be noted, however, that other types of wireless electronic devices, e.g., laptop computers, desktop computers, tablet computers, and handheld computing devices may be used. Examples of other types of handheld computing devices include scientific calculators, advanced calculators able to upload and run software applications, handheld-sized limited-purpose computer devices, handheld-sized educational computer devices, handheld-sized portable computer devices, portable computer devices, personal digital assistants (PDA), palmtop computers, cellular or mobile telephones, and any combination thereof.

In another example, embodiments are described herein in which two modes are provided. In other embodiments, more than two modes may be provided and encoded in a network SSID. Further, the mode indicators and/or locations of the mode indicators in the SSID may differ.

In another example, encoding of mode information in SSIDs may be used in networks other than classroom networks. In some such embodiments, the mode indicator may be used to indicate that a particular application is to be started on a wireless device such as a tablet computer or a smart phone. More than two modes may be supported.

In another example, rather than attempting connections in normal mode first as shown in FIG. 7, connections in configuration mode may be attempted first. Further, rather than attempting connections to all SSIDs of one mode followed by attempted connections to all SSIDs of the other mode, the attempted connections may be alternated between modes.

It is therefore contemplated that the appended claims will cover any such modifications of the embodiments as fall within the true scope of the invention.

What is claimed is:

1. A method for associating handheld calculators with a network host system of a classroom network, the method comprising:
   receiving a service set identifier (SSID) of the classroom network by a first handheld calculator, wherein the SSID comprises a network mode indicator;
   sending a request to communicate on the classroom network by the first handheld calculator, such that:
   when a configuration mode is indicated by the SSID network mode indicator, providing authentication information and device identification information that is unique to the first handheld calculator to the network host, wherein the device identification information is stored by the network host; and
   when a normal mode is indicated by the SSID network mode indicator, providing the authentication information of the first handheld calculator to the network host and receiving communication packets from the host that use the stored device identification of the first handheld calculator.

2. The method of claim 1, wherein the network mode indicator is one selected from a group consisting of a normal operation mode indicator and a configuration operation mode indicator.

3. The method of claim 2, wherein the network mode indicator is a configuration operation mode indicator, and wherein operating the first handheld calculator further comprises:
   operating the first handheld calculator in configuration mode wherein network activity of the first handheld calculator is restricted to configuration operations.

4. The method of claim 1, further comprising:
   accepting the request by the network host system, wherein the authentication information and the device identification information for the first handheld calculator is stored by the network host system to indicate that the first handheld calculator is associated with the classroom network.

5. The method of claim 4, further comprising:
   receiving another SSID of the classroom network by the first handheld calculator, wherein the SSID comprises a network mode indicator, wherein the network mode indicator is a normal operation mode indicator;
   sending a request to join the classroom network to the network host system, wherein the request comprises the authentication information; and
   accepting the request to join by the network host system based on the authentication information comprised in the request to join.

6. The method of claim 5, further comprising:
   receiving the another SSID by a second handheld calculator;
   sending, by the second handheld calculator responsive to the normal operation mode indicator, a request to join the classroom network to the network host system, wherein the request comprises authentication information for the second handheld calculator; and
   rejecting the request to join from the second handheld calculator by the network host system based on the authentication information for the second handheld calculator.

7. A system comprising:
   a network host system configured to selectively operate a classroom network in a configuration mode and a normal mode and to broadcast a service set identifier (SSID) comprising an operation mode indicator; and
   a plurality of handheld calculators each configured to receive the SSID from the network host system and to operate according to the operation mode indicator; wherein
   when a configuration mode is indicated by the SSID network mode indicator, each one of the handheld calculators is operable request access to the classroom network by providing authentication information and device identification information that is unique to the each handheld calculator to the network host, wherein network host is operable to store the device identification information; and
   when a normal mode is indicated by the SSID network mode indicator, each of the handheld calculators is operable to request access to the classroom network by providing the authentication information of the each handheld calculator to the network host; and the network host is operable to send communication packets from the host that use the stored device identification of the each handheld calculator.

8. The system of claim 7,
   wherein operating the handheld calculator in configuration mode comprises sending a request for association to the network host system, wherein the request comprises a unique identifier of the handheld calculator; and
   wherein operating in normal mode comprises sending a request to join the classroom network to the network host system, wherein the request comprises authentication information for the handheld calculator.

9. The system of claim 7,
   wherein operating the classroom network in configuration mode comprises:
   broadcasting a service set identifier (SSID) wherein the operation mode indicator indicates configuration mode;

receiving a request for association from a handheld calculator, wherein the request comprises a unique identifier of the handheld calculator; and accepting or rejecting the request for association responsive to selection by a network administrator, wherein authentication information for the handheld calculator is stored to indicate the handheld calculator is associated with the classroom network if the request for association is accepted; and wherein operating the classroom network in normal mode comprises:

broadcasting a service set identifier (SSID) wherein the operation mode indicator indicates normal mode;

receiving a request to join the classroom network from the handheld calculator, wherein the request comprises the authentication information; and allowing the handheld calculator to join the classroom network based on the authentication information.

10. A method for associating handheld calculators with a network host system of a classroom network, the method comprising:

operating the classroom network in configuration mode for a first period of time by:

broadcasting a first service set identifier (SSID) from the network host, wherein an operation mode indicator comprised in the first SSID indicates a configuration mode;

receiving a request for association from a handheld calculator, wherein the request comprises authentication information and a unique identifier of the handheld calculator; and accepting or rejecting the request for association responsive to selection by a network administrator, wherein authentication information for the handheld calculator is stored to indicate the handheld calculator is associated with the classroom network if the request for association is accepted; and operating the classroom network in normal mode for a second period of time by:

broadcasting a second service set identifier (SSID) wherein an operation mode indicator comprised in the second SSID indicates normal mode;

receiving a request to join the classroom network from the handheld calculator, wherein the request comprises the authentication information; and allowing the handheld calculator to join the classroom network based on the authentication information.

11. The method of claim 10, wherein the second period of time is on a different day from the first period of time.

* * * * *